(12) United States Patent
Boeck et al.

(10) Patent No.: US 9,072,220 B2
(45) Date of Patent: Jul. 7, 2015

(54) AGRICULTURAL HARVESTER DRIVE LINE

(71) Applicant: CNH America LLC, New Holland, PA (US)

(72) Inventors: Oldemar Boeck, Curitiba (BR); Antonio C. Bosquet, Araucaria-PR (BR)

(73) Assignee: CNH Industrial America LLC, New Holland, PA (US)

( * ) Notice: Subject to any disclaimer, the term of this patent is extended or adjusted under 35 U.S.C. 154(b) by 75 days.

(21) Appl. No.: 14/057,612

(22) Filed: Oct. 18, 2013

(65) Prior Publication Data

US 2014/0109536 A1   Apr. 24, 2014

Related U.S. Application Data

(60) Provisional application No. 61/795,572, filed on Oct. 19, 2012.

(51) Int. Cl.
| | | |
|---|---|---|
| *A01D 34/00* | (2006.01) | |
| *F16H 7/00* | (2006.01) | |
| *A01D 34/30* | (2006.01) | |
| *A01D 34/28* | (2006.01) | |
| *F16H 7/12* | (2006.01) | |
| *A01D 41/14* | (2006.01) | |
| *F16H 7/08* | (2006.01) | |

(52) U.S. Cl.
CPC .............. *A01D 34/30* (2013.01); *A01D 34/283* (2013.01); *A01D 41/14* (2013.01); *F16H 7/1281* (2013.01); *F16H 2007/0806* (2013.01); *F16H 2007/0893* (2013.01)

(58) Field of Classification Search
CPC ..... A01D 34/30; A01D 41/14; A01D 41/142; A01D 41/148; A01D 63/04; A01D 69/00; A01D 57/20; A01D 57/04; A01D 57/26; A01D 75/00; F16H 7/1281; F16H 7/12; F16H 7/24; F16H 57/023; F16H 57/035; F16H 55/36
USPC .............. 56/11.6, 13.6, 14.4, 14.7, 15.8, 208, 56/221, 314; 474/85, 87, 133, 135, 137, 474/119, 120, 174
See application file for complete search history.

(56) References Cited

U.S. PATENT DOCUMENTS

| | | | |
|---|---|---|---|
| 3,982,383 A | | 9/1976 | Mott |
| 4,011,709 A | * | 3/1977 | Mott et al. ...................... 56/10.4 |
| 4,069,650 A | * | 1/1978 | Montanari et al. .............. 56/221 |
| 4,191,006 A | | 3/1980 | Kerber et al. |
| 4,296,592 A | | 10/1981 | McIlwain |

(Continued)

*Primary Examiner* — Robert Pezzuto
(74) *Attorney, Agent, or Firm* — Patrick M. Sheldrake; Seyed V. Sharifi T.

(57) ABSTRACT

A power conveying system for use with a header of an agricultural harvester, the header having a first structural member and a second structural member being pivotally coupled to the first structural member about an axis. The power conveying system including a driving pulley, a driven pulley, an idler pulley, a flexible link and a cantilevered member. The driving pulley is coupled to the first structural member, and the driven pulley is coupled to the second structural member. The flexible link conveys power from the driving pulley to the driven pulley, and is in contact with the idler pulley. The cantilevered member is connected to the second structural member, and extends beyond the axis, where the cantilevered member is movably coupled to the idler pulley.

20 Claims, 5 Drawing Sheets

(56) References Cited

U.S. PATENT DOCUMENTS

| | | |
|---|---|---|
| 4,409,778 A | 10/1983 | McNaught |
| 4,573,308 A * | 3/1986 | Ehrecke et al. ................ 56/14.4 |
| 6,116,008 A * | 9/2000 | Digman et al. ................ 56/15.8 |
| 6,334,292 B1 * | 1/2002 | Walch et al. ................... 56/11.6 |
| 7,658,059 B2 | 2/2010 | Majkrzak |
| 7,699,734 B2 * | 4/2010 | Lohrentz ....................... 474/174 |
| 7,730,702 B2 | 6/2010 | Mortier et al. |
| 2006/0089219 A1 * | 4/2006 | Maertens et al. ............... 474/87 |

* cited by examiner

AGRICULTURAL HARVESTER DRIVE LINE

CROSS REFERENCE TO RELATED APPLICATIONS

This is a non-provisional application based upon U.S. provisional patent application Ser. No. 61/795,572, entitled "Drive line with variation of the belt length and compensator arm", filed Oct. 19, 2012, which is incorporated herein by reference.

BACKGROUND OF THE INVENTION

1. Field of the Invention

The present invention relates to agricultural harvesters such as combines, and, more particularly, to drive systems for use with a cutter bar in a header in such combines.

2. Description of the Related Art

An agricultural harvester known as a "combine" is historically termed such because it combines multiple harvesting functions with a single harvesting unit, such as picking, threshing, separating and cleaning A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger. The clean grain auger conveys the grain to a grain tank for temporary storage.

The header has a pivoting front portion that includes the cutter bar, which is driven by a belt and pulley system. The belt and pulley system typically has two idler pulleys to compensate for the change in needed belt length as the pivoting of the front-most section of the header pivots relative to the rearward portion of the header. The cutter bar is more directly driven by a wobble box that is driven by one of the pulleys over which the belt passes. The idler pulleys are used to compensate for the change in belt length as the pivoting occurs.

What is needed in the art is a belt compensation system that is easy to implement with minimal parts and minimal contact with the belt.

SUMMARY OF THE INVENTION

The present invention provides a method and apparatus to compensate for pivotal movement of a drive system in a header section of an agricultural harvester.

The invention in one form is directed to an agricultural harvester, including a chassis and a ground engaging transport system supporting the chassis and a power conveying system for use with a header of an agricultural harvester. The header having a first structural member, and a second structural member being pivotally coupled to the first structural member about an axis. The power conveying system including a driving pulley, a driven pulley, an idler pulley, a flexible link and a cantilevered member. The driving pulley is coupled to the first structural member, and the driven pulley is coupled to the second structural member. The flexible link conveys power from the driving pulley to the driven pulley, and is in contact with the idler pulley. The cantilevered member is connected to the second structural member, and extends beyond the axis, where the cantilevered member is movably coupled to the idler pulley.

The invention in another form is directed to a power conveying system for use with a header of an agricultural harvester, the header having a first structural member and a second structural member being pivotally coupled to the first structural member about an axis. The power conveying system including a driving pulley, a driven pulley, an idler pulley, a flexible link and a cantilevered member. The driving pulley is coupled to the first structural member, and the driven pulley is coupled to the second structural member. The flexible link conveys power from the driving pulley to the driven pulley, and is in contact with the idler pulley. The cantilevered member is connected to the second structural member, and extends beyond the axis, where the cantilevered member is movably coupled to the idler pulley.

The invention in yet another form is directed to method of maintaining a pressure on a flexible link of a power conveying system. The power conveying system being used with a header of an agricultural harvester, with the header having a first structural member and a second structural member pivotally coupled to the first structural member about an axis. The method includes the steps of driving the flexible link, driving a driven pulley and moving an idler pulley. The driving the flexible link step includes driving the flexible link with the driving pulley coupled to the first structural member. The driving a driven pulley step includes driving the driven pulley coupled to the second structural member with the flexible link, the flexible link being in contact with the idler pulley. The moving the idler pulley step includes moving the idler pulley with a cantilevered member as the second structural member pivots about the axis, with the cantilevered member being connected to the second structural member, and the cantilevered member extending beyond the axis where the cantilevered member is movably coupled to the idler pulley.

The present invention advantageously provides a reduced number of idler pulleys over the prior art in the inventive solution of the present invention.

Another advantage of the present invention is that the tensioning mechanism is not impacted by changes in the effective belt length.

Yet another advantage of the present invention is that the geometry of the cantilevered member and where it is coupled to the pivot arm compensate for the change in relative distance between the driving and the driven pulleys.

Still yet another advantage of the present invention is that the drive system is able use only three pulleys, with one of them being an idler pulley.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
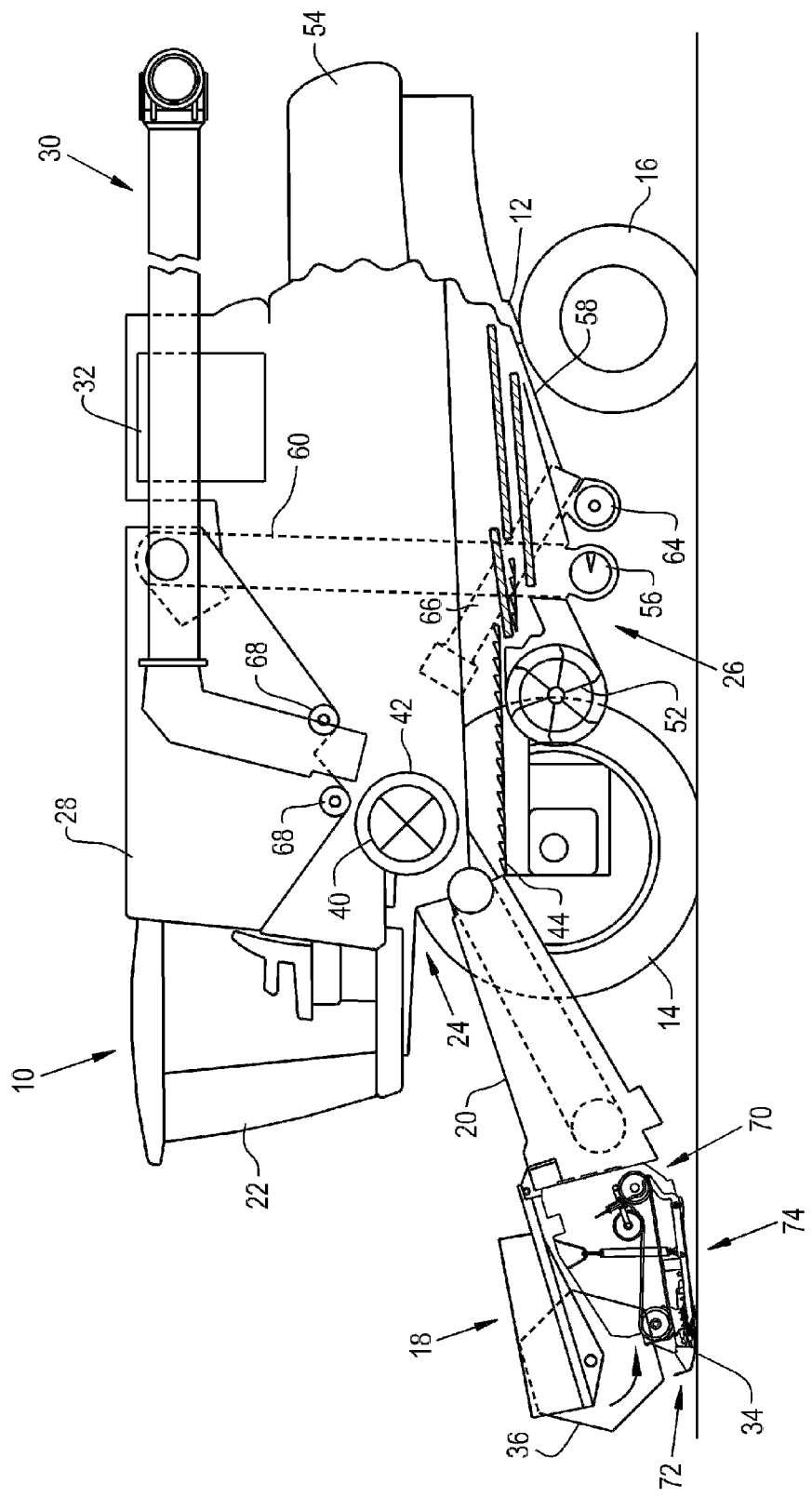
FIG. 1 is a side view of an embodiment of an agricultural harvester in the form of a combine which includes an embodiment of a drive line of the present invention.
Figure 2:
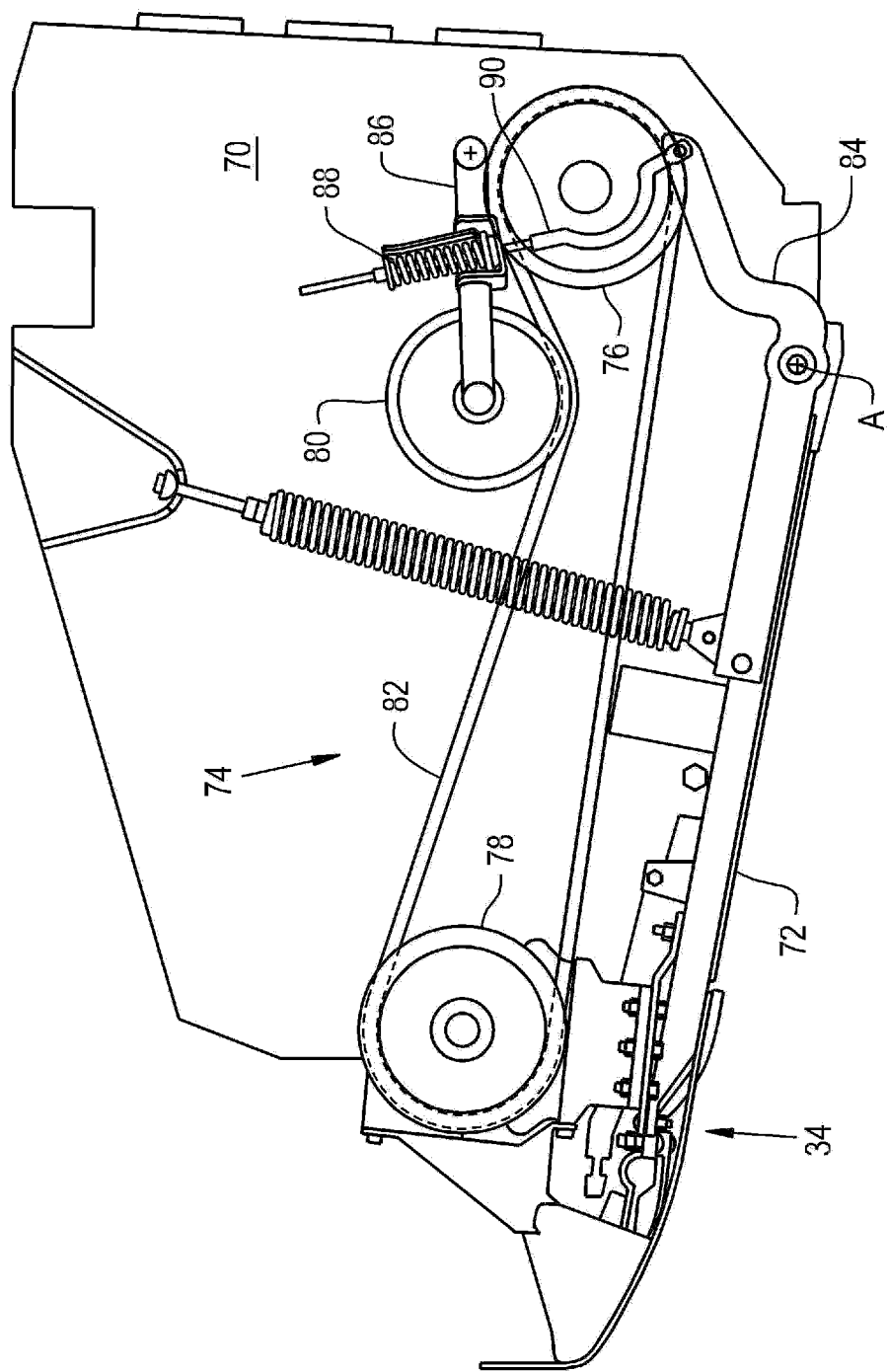
FIG. 2 is a side view of the header assembly used in the combine of FIG. 1 showing details of the drive line, also referred to as a power conveying system of the present invention.
Figure 3:
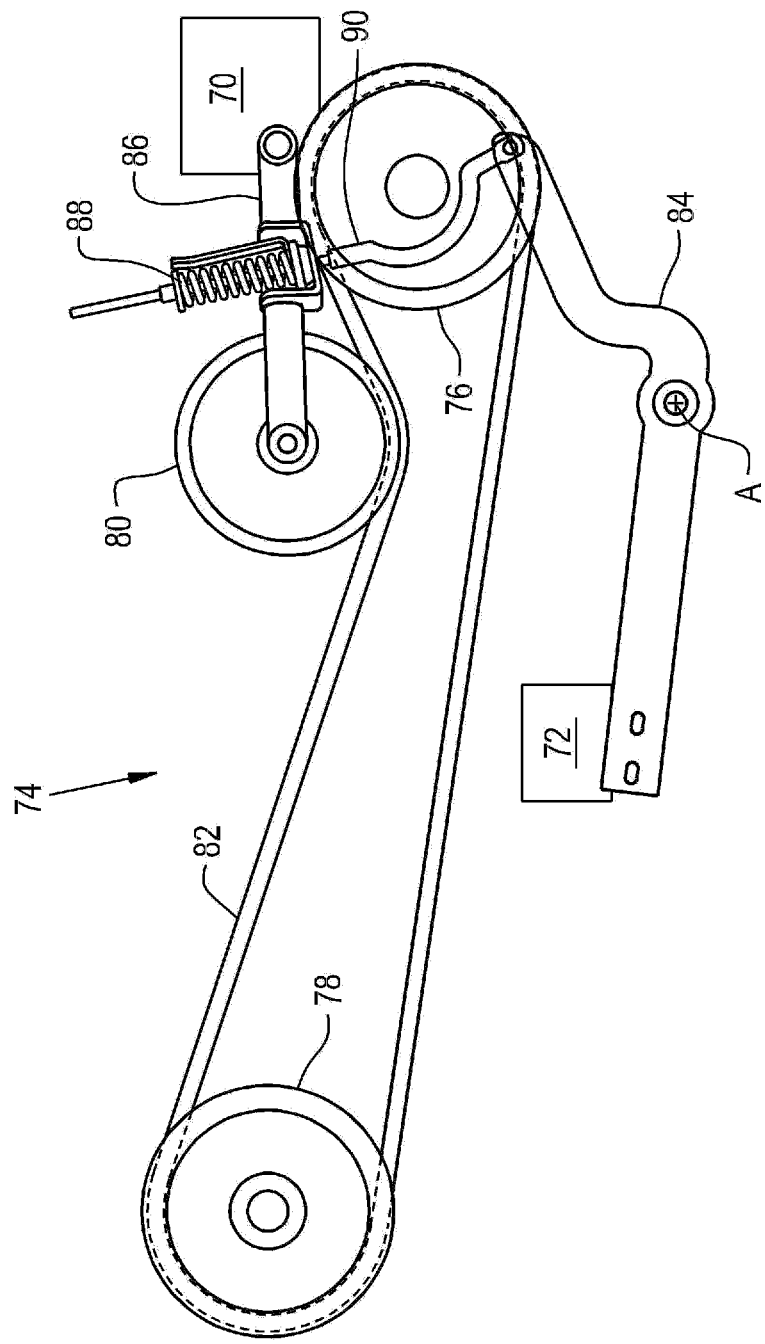
FIG. 3 is another side view, being somewhat schematized, of the power conveying system of FIGS. 1 and 2.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing system 24, a cleaning system 26, a grain tank 28, and an unloading auger 30. Wheels 14 and 16 along with their driving mechanism is collectively a transport system that carries chassis 12.

The front wheels 14 are larger flotation type wheels, and rear wheels 16 are smaller steerable wheels. Motive force is selectively applied to the front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of the combine 10. A rotatable reel 36 feeds the crop into the header 18, and an auger feeds the severed crop laterally inwardly from each side toward the feeder housing 20. Feeder housing 20 conveys the cut crop to the threshing system 24, and is selectively vertically movable using appropriate actuators, such as hydraulic cylinders (not shown).

The threshing and separating system 24 is a traversely oriented threshing system, and generally includes a threshing drum 40 at least partially enclosed by and rotatable within a corresponding perforated concave 42. The cut crops are threshed and separated by the rotation of threshing drum 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve, an upper sieve (also known as a chaffer sieve), a lower sieve (also known as a cleaning sieve), and a cleaning fan 52. Grain on the sieves is subjected to a cleaning action by fan 52 which provides an airflow through the sieves to remove chaff and other impurities such as dust from the grain by making this material airborne for discharge from a straw hood 54 of the combine 10. Grain pan 44 and a pre-cleaning sieve oscillate in a fore-to-aft manner to transport the grain and finer non-grain crop material to the upper surface of an upper sieve.

Clean grain falls to a clean grain auger 56 positioned crosswise below and in front of a lower sieve. The clean grain auger 56 receives clean grain from each sieve and from a bottom pan 58 of cleaning system 26. The clean grain auger 56 conveys the clean grain laterally to a generally vertically arranged grain elevator 60 for transport to grain tank 28. Tailings from the cleaning system 26 fall to a tailings auger trough. The tailings are transported via a tailings auger 64 and return auger 66 to the upstream end of the cleaning system 26 for repeated cleaning action. A pair of grain tank augers 68 at the bottom of the grain tank 28 convey the clean grain laterally within the grain tank 28 to the unloading auger 30 for discharge from the combine 10.

The non-grain crop material proceeds through a residue handling system. The residue handling system includes a chopper, counter knives, a windrow door and a residue spreader.

Now, additionally referring to FIGS. 2-5 there is shown a drive line 74 in the form of a power conveying system 74 that is coupled in part to both a first structural member 70 and a second structural member 72, both of which are part of header mechanism 18. Second structural member 72 is pivotally coupled to first structural member 70 about an axis A. Second structural member 72 includes cutter bar 34, which is driven by power conveying system 74. Second structural member 72 is the front part of header 18 and pivots about axis A, thereby allowing cutter bar 34 to follow the profile of the ground during the harvesting process. This uses a flex cutter bar header, which sets the knives of cutter bar 34 at a selected height for cutting the crop and protects cutter bar 34 from hitting bumps on the ground, which could damage cutter bar 34. The position of structural member 72 relative to structural member 70 can also be selected using an automatic header height control system, which allows an operator the option to select the cutting height and sensors and actuators control the pivotal position of structural member 72.

Power conveying system 74 includes a driving pulley 76, a driven pulley 78, an idler pulley 80, a flexible link 82, a cantilevered member 84, a pivot arm 86, a tensioning device 88 and a linkage 90. For use herein the term "pulley" includes cogged pulley, gears and other rotatable power conveying devices. Power from engine 32 of combine 10 is routed to driven pulley 78 to ultimately drive cutter bar 34. Driving pulley 76 is rotatably coupled to first structural member 70 and driven pulley 78 is rotatably coupled to second structural member 72.

Flexible link 82 conveys power from driving pulley 76 to driven pulley 78, with flexible link 82 being in contact with idler pulley 80. Flexible link 82 may be in the form of a belt 82, such as a V-belt. Cantilevered member 84 is connected to second structural member 72 and generally moves as second structural member 72 moves and pivots about axis A. Cantilevered member 84 extends beyond axis A, to the right as viewed in the figures, to where cantilevered member 84 is coupled to idler pulley 80 by way of linage 90 and tensioning device 88.

Idler pulley 80 is configured to substantially maintain a predetermined pressure on flexible link 82 as second structural member 72 pivots about axis A. This is accomplished by the movement of the distal (right) end of cantilevered member 84 moving pivot arm 86, so that tensioning device 88 is not substantially effected by the change in distance between driving pulley 76 and driven pulley 78 as second structural member 72 pivots about axis A.

Only driving pulley 76, driven pulley 78 and idler pulley 80 are in contact with flexible link 82. Only a singular idler pulley 80 is used to both offset the effect on flexible link 82 by the pivoting of structural member 72 and to maintain the tension on flexible link 82. This is accomplished with substantially no impact on tensioning device 88, allowing the adjustment thereof to be solely to tension flexible link 82 regardless of the relative position of structural member 72 relative to structural member 70.

Figure 4:
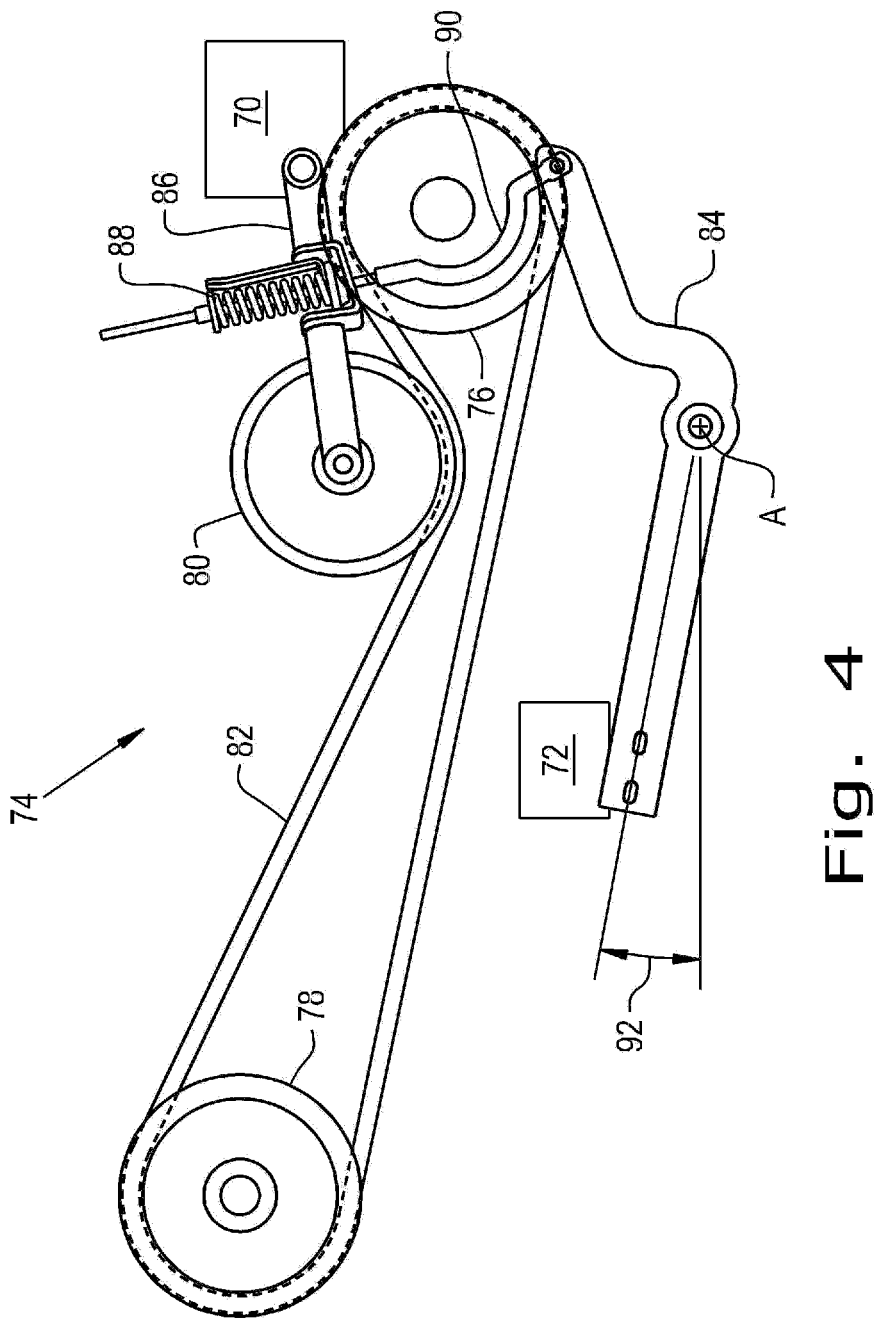
FIG. 4 is yet another side view, being somewhat schematized, of the power conveying system of FIGS. 1-3.
Figure 5:
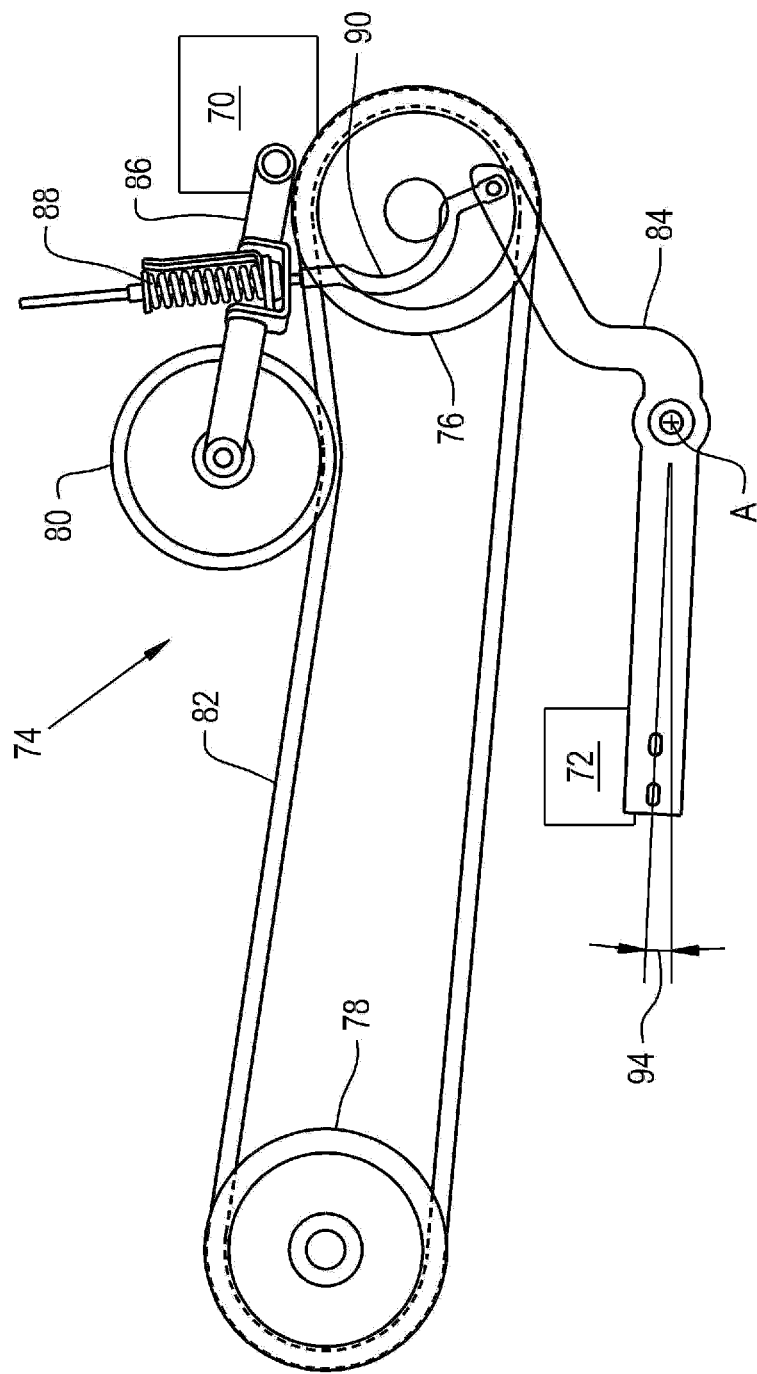
FIG. 5 is still yet another side view, being somewhat schematized, of the power conveying system of FIGS. 1-4.

The working of power conveying system 74 can be seen by contrasting FIGS. 4 and 5, where cantilevered member 84 is shown as having angles 92 and 94 relative to horizontal, in the two figures, which is representative of the relative movement of structural members 72 and 70 to each other and the compensation for the change in needed belt length as pulleys 76 and 78 have different distances due to the differences in angles 92 and 94.

Advantageously, the present invention compensates for variations in the slack of the belt caused by a changing relative position of driven pulley 78 and driving pulley 76. This is accomplished while maintaining the exact same, or nearly the same, idler pulley pressure on belt 82 as the position of driven pulley 78 changes. The present invention accomplishes these goals of constant pressure on the belt and length compensation of the belt using only three pulleys. According to the present invention, belt 82 has the tension therein dynamically adjusted in just the right proportion to keep the tension substantially constant.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester, comprising:
    a chassis;
    a ground engaging transport system supporting said chassis; and
    a header mechanism extending from said chassis, said header mechanism including:
        a first structural member;
        a second structural member pivotally coupled to said first structural member about an axis;
        a power conveying system, having:
            a driving pulley coupled to said first structural member;
            a driven pulley coupled to said second structural member;
            an idler pulley;
            a flexible link conveying power from said driving pulley to said driven pulley, said flexible link in contact with said idler pulley; and
            a cantilevered member connected to said second structural member, said cantilevered member extending beyond said axis where said cantilevered member is movably coupled to said idler pulley.

2. The agricultural harvester of claim 1, wherein said idler pulley is configured to substantially maintain a predetermined pressure on said flexible link as said second structural member pivots about said axis.

3. The agricultural harvester of claim 1, wherein said header mechanism further includes a cutting mechanism coupled to said second structural member and driven by said driven pulley.

4. The agricultural harvester of claim 1, wherein only said driving pulley, said driven pulley and said idler pulley are in contact with said flexible link.

5. The agricultural harvester of claim 1, wherein said power conveying system further has a pivot arm pivotally connected to said first structural member, said pivot arm being rotationally coupled to said idler pulley, said cantilevered member being coupled to said pivot arm.

6. The agricultural harvester of claim 5, wherein said power conveying system further has a tensioning device, said cantilevered member being coupled to said pivot arm by way of said tensioning device.

7. The agricultural harvester of claim 6, wherein said power conveying system is configured to compensate for the change in distance between said driving pulley and said driven pulley as said second structural member pivots about said axis with said tensioning device being substantially unchanged.

8. The agricultural harvester of claim 7, wherein said flexible link is a belt.

9. A power conveying system for use with a header of an agricultural harvester, the header having a first structural member and a second structural member being pivotally coupled to the first structural member about an axis, the power conveying system comprising:
   a driving pulley coupled to the first structural member;
   a driven pulley coupled to the second structural member;
   an idler pulley;
   a flexible link conveying power from said driving pulley to said driven pulley, said flexible link in contact with said idler pulley; and
   a cantilevered member connected to said second structural member, said cantilevered member extending beyond said axis where said cantilevered member is movably coupled to said idler pulley.

10. The power conveying system of claim 9, wherein said idler pulley is configured to substantially maintain a predetermined pressure on said flexible link as said second structural member pivots about said axis.

11. The power conveying system of claim 9, wherein the header mechanism further includes a cutting mechanism coupled to the second structural member and driven by said driven pulley.

12. The power conveying system of claim 9, wherein only said driving pulley, said driven pulley and said idler pulley are in contact with said flexible link.

13. The power conveying system of claim 9, further comprising a pivot arm pivotally connected to the first structural member, said pivot arm being rotationally coupled to said idler pulley, said cantilevered member being coupled to said pivot arm.

14. The power conveying system of claim 13, further comprising a tensioning device, said cantilevered member being coupled to said pivot arm by way of said tensioning device.

15. The power conveying system of claim 14, wherein the power conveying system is configured to compensate for the change in distance between said driving pulley and said driven pulley as said second structural member pivots about said axis with said tensioning device being substantially unchanged.

16. The power conveying system of claim 15, wherein said flexible link is a belt.

17. A method of maintaining a pressure on a flexible link of a power conveying system, the power conveying system being used with a header of an agricultural harvester, the header having a first structural member and a second structural member being pivotally coupled to the first structural member about an axis, the method including the steps of:
   driving the flexible link with a driving pulley coupled to the first structural member;
   driving a driven pulley coupled to the second structural member with the flexible link, said flexible link being in contact with an idler pulley; and
   moving said idler pulley with a cantilevered member as the second structural member pivots about the axis, the cantilevered member being connected to the second structural member, said cantilevered member extending beyond the axis where said cantilevered member is movably coupled to said idler pulley.

18. The method of claim 17, wherein the header further includes a cutting mechanism coupled to the second structural member and driven by said driven pulley.

19. The method of claim 17, wherein only said drive pulley, said driven pulley and said idler pulley are in contact with said flexible link.

20. The method of claim 17, wherein a pivot arm is pivotally connected to the first structural member, said pivot arm being rotationally coupled to said idler pulley, said cantilevered member being coupled to said pivot arm.

\* \* \* \* \*